(12) United States Patent
Walter

(10) Patent No.: US 7,383,213 B1
(45) Date of Patent: Jun. 3, 2008

(54) APPARATUS AND METHOD FOR MAINTAINING A CHILDREN'S AUTOMATED BANK ACCOUNT

(75) Inventor: Joanne S. Walter, Alpharetta, GA (US)

(73) Assignee: NCR Corporation, Dayton, OH (US)

(*) Notice: Subject to any disclaimer, the term of this patent is extended or adjusted under 35 U.S.C. 154(b) by 1689 days.

(21) Appl. No.: 09/629,735

(22) Filed: Jul. 31, 2000

(51) Int. Cl.
    *G06Q 40/00* (2006.01)

(52) U.S. Cl. ............................ 705/35; 705/38; 705/39; 705/40

(58) Field of Classification Search ................. 705/14, 705/26, 35, 41, 38–40, 42, 16; 235/380; 902/5
See application file for complete search history.

(56) References Cited

U.S. PATENT DOCUMENTS

| | | | | |
|---|---|---|---|---|
| 4,321,672 A | * | 3/1982 | Braun et al. .................. 705/42 |
| 4,386,266 A | * | 5/1983 | Chesarek ..................... 705/72 |
| 4,454,414 A | | 6/1984 | Benton ........................ 705/41 |
| 4,837,422 A | * | 6/1989 | Dethloff et al. ............. 235/380 |
| 5,083,638 A | | 1/1992 | Schneider ................... 186/61 |
| 5,115,888 A | | 5/1992 | Schneider ................... 186/61 |
| 5,267,314 A | * | 11/1993 | Stambler .................... 713/176 |
| 5,350,906 A | * | 9/1994 | Brody et al. ................ 235/379 |
| 5,430,644 A | | 7/1995 | Deaton et al. ............... 705/14 |
| 5,482,139 A | | 1/1996 | Rivalto ....................... 186/36 |
| 5,619,558 A | | 4/1997 | Jheeta ...................... 379/92.01 |
| 5,621,812 A | | 4/1997 | Deaton et al. ............... 382/100 |
| 5,649,118 A | * | 7/1997 | Carlisle et al. .............. 705/41 |
| 5,845,260 A | | 12/1998 | Nakano et al. ............... 705/26 |
| 5,864,830 A | * | 1/1999 | Armetta et al. .............. 705/41 |
| 5,878,141 A | * | 3/1999 | Daly et al. .................. 705/78 |
| 5,897,625 A | * | 4/1999 | Gustin et al. ................ 705/43 |
| 5,914,472 A | | 6/1999 | Foladare et al. ............ 235/380 |
| 5,937,396 A | * | 8/1999 | Konya ........................ 705/43 |
| 5,953,710 A | * | 9/1999 | Fleming ...................... 705/38 |
| 5,963,647 A | * | 10/1999 | Downing et al. ............. 705/39 |
| 6,021,943 A | * | 2/2000 | Chastain .................... 235/379 |
| 6,173,269 B1 | * | 1/2001 | Solokl et al. ................ 705/35 |

(Continued)

OTHER PUBLICATIONS

Anonymous; Texas Banking; "Banks can take steps to guard against ID Fraud"; V89, n. 10; pp. 1-4.*

*Primary Examiner*—Ella Colbert
(74) *Attorney, Agent, or Firm*—Maginot Moore & Beck, LLP

(57) ABSTRACT

An electronic terminal includes an input device for receiving input from a user. The electronic terminal also includes a processing unit electrically coupled to the input device. Yet further, the electronic terminal includes a memory device electrically coupled to the processing unit. The memory device has stored therein a plurality of instructions which, when executed by the processing unit, causes the processing unit to (a) permit the user to deposit funds into a banking account if the user enters either a first PIN number or a second PIN number with the input device, the first PIN number being different than the second PIN number, (b) permit the user to withdraw a first dollar amount from the banking account if the user enters the first PIN number with the input device, and (c) permit the user to withdraw a second dollar amount from the banking account if the user enters the second PIN number with the input device, wherein the first dollar amount is less than the second dollar amount. A method of operating an electronic banking terminal is also disclosed.

20 Claims, 2 Drawing Sheets

U.S. PATENT DOCUMENTS

| | | | |
|---|---|---|---|
| 6,308,887 B1 * | 10/2001 | Korman et al. | 235/379 |
| 6,330,544 B1 * | 12/2001 | Walker et al. | 705/14 |
| 6,339,766 B1 * | 1/2002 | Gephart | 705/44 |
| 6,394,343 B1 * | 5/2002 | Berg et al. | 235/379 |
| 6,422,462 B1 * | 7/2002 | Cohen | 235/381 |
| 6,473,500 B1 * | 10/2002 | Risafi et al. | 379/144.01 |
| 6,609,089 B1 * | 8/2003 | Ball et al. | 704/9 |

* cited by examiner

APPARATUS AND METHOD FOR MAINTAINING A CHILDREN'S AUTOMATED BANK ACCOUNT

TECHNICAL FIELD OF THE INVENTION

The present invention relates generally to a banking system, and more particularly to an apparatus and method for maintaining a children's automated bank account.

BACKGROUND OF THE INVENTION

Banks and other financial institutions have historically offered a number of services and features which provide for savings plans which vary from a typical banking account. For example, parents have long since opened savings accounts in the name of their children in order to provide an opportunity to teach their children the value of money and particularly, the value of saving money. In this manner, the parent could accompany the child into the bank such that, under the authority of the parent, the child could withdraw funds from, or deposit money into, his or her savings account.

However, changes in the banking industry have reduced such practices. In particular, as automated banking becomes more prevalent, customers are visiting their bank's physical locations (e.g. branches) less frequently. For example, due to the widespread implementation of automated teller machines (ATMs), banking customers are able to do most, if not all, of their banking at the ATM without the need to actually visit a bank branch office. Moreover, since many retailers such as grocery stores and department stores accept bank cards for payment and even offer "cash back", the need for a visit to a branch office is yet further reduced. Hence, heretofore practices of providing for children's savings accounts have become substantially less utilized.

What is needed therefore is a method and apparatus for maintaining a children's bank account which overcomes one or more of the above-mentioned drawbacks. What is particularly needed is a method and apparatus for maintaining a children's bank account which can be utilized via a banking terminal such as an ATM or point-of-sale retail terminal.

SUMMARY OF THE INVENTION

In accordance with one embodiment of the present invention, there is provided a method of operating an electronic banking terminal. The method includes the step of permitting a user to deposit funds into a banking account if the user enters either a first PIN number or a second PIN number. The first PIN number is different than the second PIN number. The method also includes the step of permitting the user to withdraw a first dollar amount from the banking account if the user enters the first PIN number. Moreover, the method includes the step of permitting the user to withdraw a second dollar amount from the banking account if the user enters the second PIN number. The first dollar amount is less than the second dollar amount.

In accordance with another embodiment of the present invention, there is provided an electronic terminal. The electronic terminal includes an input device for receiving input from a user. The electronic terminal also includes a processing unit electrically coupled to the input device. Yet further, the electronic terminal includes a memory device electrically coupled to the processing unit. The memory device has stored therein a plurality of instructions which, when executed by the processing unit, causes the processing unit to (a) permit the user to deposit funds into a banking account if the user enters either a first PIN number or a second PIN number with the input device, the first PIN number being different than the second PIN number, (b) permit the user to withdraw a first dollar amount from the banking account if the user enters the first PIN number with the input device, and (c) permit the user to withdraw a second dollar amount from the banking account if the user enters the second PIN number with the input device, wherein the first dollar amount is less than the second dollar amount.

In accordance with yet another embodiment of the present invention, there is provided a method of operating an electronic banking terminal. The method includes the step of permitting a first user to deposit funds into a banking account if the first user enters an account number associated with the banking account and a first PIN number. The method also includes the step of permitting a second user to deposit funds into the banking account if the second user enters the account number and a second PIN number. The first PIN number is different than the second PIN number. The method further includes the step of permitting the first user to withdraw a first dollar amount from the banking account if the first user enters the account number and the first PIN number. In addition, the method includes the step of permitting the second user to withdraw a second dollar amount from the banking account if the second user enters the account number and the second PIN number. The first dollar amount is less than the second dollar amount.

It is therefore an object of the present invention to provide a new and useful electronic banking terminal.

It is moreover an object of the present invention to provide an improved electronic banking terminal.

It is a further object of the present invention to provide a new and useful method of operating an electronic banking terminal.

It is also an object of the present invention to provide an improved method of operating an electronic banking terminal.

It is yet another object of the present invention to provide a low-cost, easy-to-operate electronic banking terminal for maintaining a children's bank account.

The above and other objects, features, and advantages of the present invention will become apparent from the following description and the attached drawings.

DETAILED DESCRIPTION OF THE INVENTION

Figure 1:
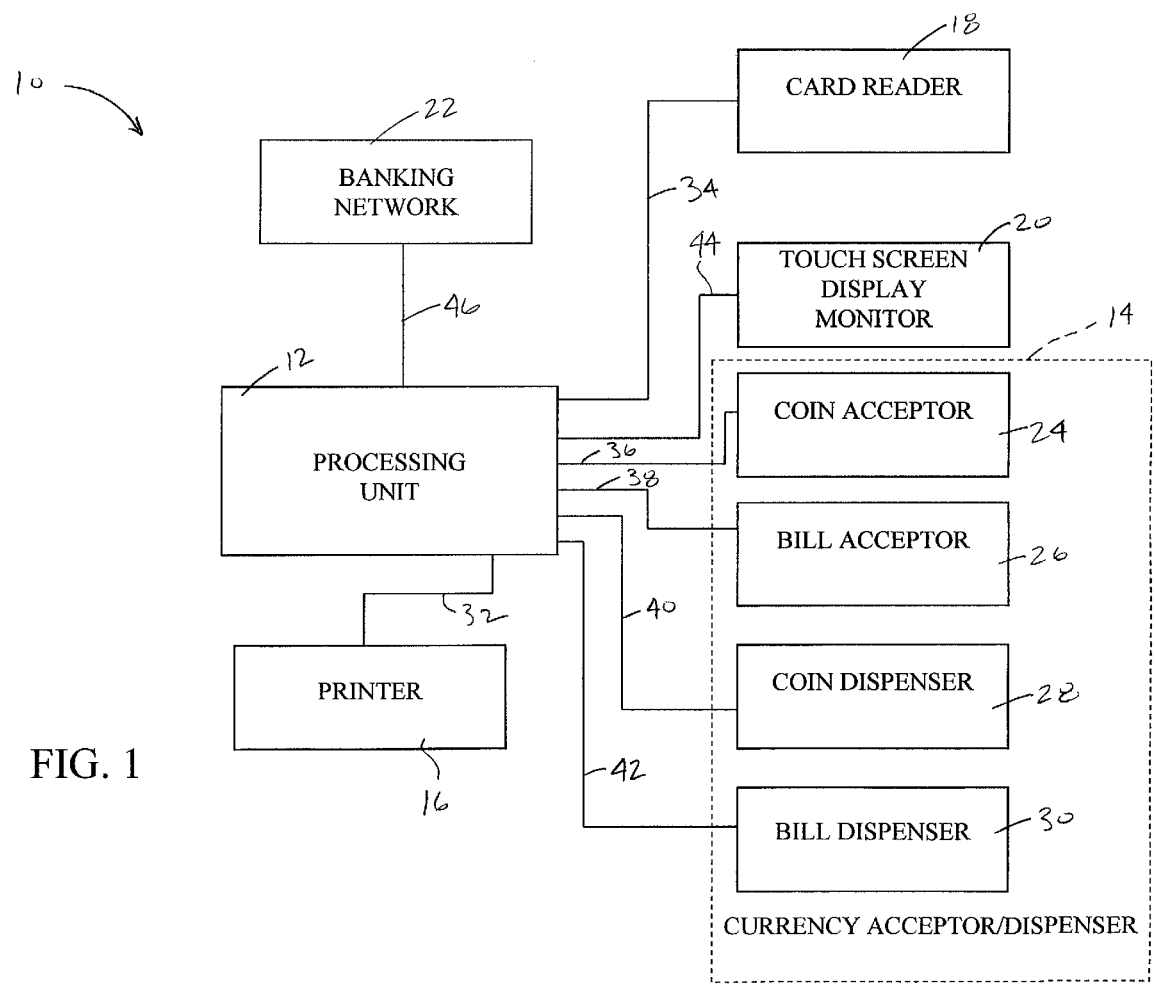
FIG. 1 is a block diagram of an electronic banking terminal which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown an electronic banking terminal 10 having a processing unit 12, a currency acceptor/dispenser 14, a printer 16, and a number of input devices such as a card reader 18 and a touch screen display monitor 20. The banking terminal 10 is in communication with a banking network 22 such as the network associated with a bank or other financial institution.

The processing unit 12 is, in essence, a personal computer (PC) and includes a microprocessor (not shown) and a number of memory modules (not shown) along with other commonly utilized PC components such as an Ethernet controller, a number of video control devices, a storage memory device such as a hard drive device, and a number of connector ports for coupling the processing unit 12 to a number of peripheral devices such as the currency acceptor/dispenser 14, the printer 16, the card reader 18, and the touch screen display monitor 20.

The currency acceptor/dispenser 14 of the banking terminal 10 includes the system components necessary to allow a user to deposit and/or withdraw currency. In particular, the currency acceptor/dispenser 14 includes a pair of currency acceptors such as a coin acceptor 24 and a bill acceptor 26, along with a corresponding pair of currency dispensers such as a coin dispenser 28 and a bill dispenser 30. Hence, if a user desires to make a cash deposit consisting of any combination of bills and coins, the coin acceptor 24 may be utilized to accept the portion of the deposit being made in coins, whereas the bill acceptor 26 may be utilized to accept the portion of the deposit being made in bills. Similarly, if a user desires to make a cash withdraw consisting of any combination of bills and coins, the coin dispenser 28 may be utilized to dispense the portion of the withdraw being made in coins, whereas the bill dispenser 30 may be utilized to dispense the portion of the withdraw being made in bills.

As alluded to above, the display monitor 20 is preferably a known touch screen monitor which can generate data signals when certain areas of the screen are touched by a user. Hence, the display monitor 20 may be utilized by the user to input information into the banking terminal 10. For example, a "keypad" may be displayed on the touch screen of the display monitor so as to allow a user to enter his or her personal identification number (hereinafter "PIN number"). A portion of the touch screen associated with the display monitor 20 may also be utilized as a "help button" such that assistance is provided to the user when it is touched by the user.

The printer 16 is provided to generate transaction receipts at the completion of a banking transaction. Moreover, as shall be discussed below in greater detail, the printer 16 may also be utilized to print a greeting or congratulatory message on the transaction receipt. The printer 16 may be embodied as any type of ink-jet, laser, dot-matrix, LED, or thermal printer which is capable of printing the alphanumeric characters associated with a transaction receipt.

The card reader 18 is provided to read information stored on a user's card. The card reader 18 may include a known magnetic strip and/or smart card reader which is capable of reading information stored on the user's bank card. For example, the user's card may be embodied as a known magnetic strip card having the user's bank account number stored thereon. In such a case, the card reader 18 may be utilized to read the user's account number from his or her bank card.

As shown in FIG. 1, the processing unit 12 is electrically coupled to each of the currency acceptor/dispenser 14, the printer 16, the card reader 18, and the touch screen display monitor 20. In particular, a serial or other type of communication port associated with the printer 16 is coupled to a corresponding serial port (or other type of communication port, as needed) of the processing unit 12 via a serial communication line 32 (e.g. an RS-232 serial data cable). Hence, the processing unit 12 communicates with the printer 12 via the communication line 32 in order to generate transaction receipts at the completion of a banking transaction. As suggested above, the printer 16 (and certain of the terminal components described below) are exemplary described herein as being coupled to the processing unit 12 via use of a serial communication protocol; however, it should be appreciated that such use of a serial communication protocol could be replaced by other communication protocols in order to fit the needs of a given banking terminal or terminal component. For example, the terminal components may alternatively be coupled to the processing unit 12 via a parallel or USB communication protocol.

Similarly, a serial port of the card reader 18 is coupled to a corresponding serial port of the processing unit 12 via a serial communication line 34 (e.g. an RS-232 serial data cable). Hence, the processing unit 12 communicates with the card reader 34 in order to read a code stored on a bank card such as a magnetic strip or smart card.

A serial port of the coin acceptor 24 is coupled to a corresponding serial port of the processing unit 12 via a serial communication line 36 (e.g. an RS-232 serial data cable). Hence, the processing unit 12 communicates with the coin acceptor 24 in order to accept coins from a user during performance of a deposit transaction. In particular, when a user inserts coins into the coin acceptor 24, the coin acceptor 24 generates an output signal indicative of the value of each coin which is inserted into the coin acceptor 24. Such an output signal is communicated to the processing unit 12 in order to determine the amount of the coins which have been inserted into the coin acceptor 24 for purposes of determining the total of the user's deposit.

Similarly, a serial port of the bill acceptor 26 is coupled to a corresponding serial port of the processing unit 12 via a serial communication line 38 (e.g. an RS-232 serial data cable). Hence, the processing unit 12 communicates with the bill acceptor 26 in order to accept bills from a user during performance of a deposit transaction. In particular, when a user inserts bills into the bill acceptor 26, the bill acceptor 26 generates an output signal indicative of the value of each bill which is inserted into the bill acceptor 26. Such an output signal is communicated to the processing unit 12 in order to determine the amount of the bills which have been inserted into the bill acceptor 26 for purposes of determining the total of the user's deposit.

In a similar manner, a serial port of the coin dispenser 28 is coupled to a corresponding serial port of the processing unit 12 via a serial communication line 40 (e.g. an RS-232 serial data cable). Hence, the processing unit 12 communicates with the coin dispenser 28 in order to dispense coins to a user when the user requests a withdraw amount that requires coins. In particular, when a user is owed coins during a withdraw transaction, the processing unit 12 generates an output signal indicative of the quantity of each type of coin that is owed the user. Such an output signal is communicated to the coin dispenser 28 thereby causing the coin dispenser 28 to dispense the correct quantity of each type of coin to the user.

Moreover, a serial port of the bill dispenser 30 is coupled to a corresponding serial port of the processing unit 12 via a serial communication line 42 (e.g. an RS-232 serial data cable). Hence, the processing unit 12 communicates with the bill dispenser 30 in order to dispense bills to a user when the user requests a withdraw amount that requires bills. In particular, when a user is owed bills during a withdraw transaction, the processing unit 12 generates an output signal indicative of the quantity of each type of bill that is owed the user. Such an output signal is communicated to the bill dispenser 30 thereby causing the bill dispenser 30 to dispense the correct quantity of each type of bill to the user.

The processing unit 12 is further electrically coupled to the touch screen display monitor 20 via a data communication line 44. Hence, when a user touches a particular portion of the touch screen, data signals indicative of the portion of the screen which has been touched are generated by the touch screen display monitor 20 and the thereafter communicated to the processing unit 12 via the data communication line 44. For example, the processing unit 12 communicates with the touch screen display monitor 20 in order to receive data such as PIN numbers which are input by the user via use of the "keypad" displayed on the touch screen monitor 20.

The processing unit 12 includes network interface circuitry (not shown) which conventionally permits the banking terminal 10 to communicate with the banking network 22 through a wired connection 46. The processing unit 12 communicates with the banking network 46 during a banking transaction in order to obtain information, such as account balance information, the authorized PIN numbers associated with a given bank account, and the like. The network interface circuitry associated with the banking terminal 10 may include a known Ethernet expansion card, and the wired connection 46 may include a known twisted-pair communication line. Alternatively, the network interface circuitry may support wireless communications with the banking network 22.

OPERATION OF THE PRESENT INVENTION

In operation, the banking terminal 10 of the present invention may be utilized to maintain a bank account for a small child or any other person which requires a certain level of stewardship in regard to maintenance of their banking account. In particular, the banking terminal 10 utilizes a "multi-tiered PIN" approach to maintenance of a bank account such as a savings account.

More specifically, a plurality of PIN numbers may be utilized in conjunction with a single bank account. Such use of multiple PIN numbers is useful for establishing varying withdraw limits for different users. For example, a first PIN number associated with a given bank account may be utilized to allow a first user to withdraw larger amounts of funds relative to the amount of funds that may be withdrawn with a second PIN number associated with the same bank account. In the specific case of maintaining a child's bank account, the child may be issued a PIN number which allows the child to withdraw only a predetermined amount of cash (e.g. twenty dollars), whereas the child's parent or guardian is issued a second, different PIN number which allows the parent or guardian to withdraw a relatively unlimited amount of cash (up to any levels established by the bank). The amount of cash which the child is allowed to withdraw may be adjusted to fit the needs of a given situation. For example, the amount of cash that the child is allowed to withdraw (based on the limits associated with his or her PIN number) may be adjusted upwardly as the child advances in age.

It should be appreciated that although each of the plurality of PIN numbers associated with a given bank account provide for varying levels of withdraw authorization, all of such PIN numbers preferably allow for unlimited deposit authorization. In particular, irrespective of whether the user enters a first PIN number or a second PIN number, the user preferably is authorized to deposit an unlimited amount of funds into the associated bank account. In particular regard to the child's bank account example, both the child and the parent or guardian preferably have the authority to deposit an unlimited amount of funds into the child's bank account via use of either one of their respective PIN numbers.

In addition, PIN numbers may also be established for use as "deposit only" PIN numbers. For example, PIN numbers may be assigned to a bank account which allow a user gain access to the account for the sole purpose of depositing funds into the account, but do not allow the user to perform any other transactions such as the withdraw of funds or the performance of balance inquiries. Such an arrangement is particularly useful in the case of maintaining a child's bank account. For example, relatives of the child (e.g. aunts, uncles, grandparents, etcetera) may be given a bank card along with an associated "deposit only" PIN number. On occasions such as birthdays, graduation, or holidays, the relative may use the card to deposit money directly into the child's account thereby eliminating the need to send the gift via other manners such as by mail. Moreover, in the case of where a relative deposits money directly into the child's account, the electronic banking terminal 10 is preferably configured to allow the relative to leave a short message or greeting which is displayed on the display monitor 20, printed with the printer 16, or otherwise played back (such as an audio/visual message) to the child the next time the child accesses his or her account.

It should be appreciated that in order to provide for such depositing of funds by relatives or the like, the electronic banking terminal 10 may be equipped with a bar code or other type of reader (not shown). In such a configuration, bar codes could be, for example, printed on an invitation to the child's birthday party. Such a bar code may have stored therein information which includes the account number of the child's bank account and a "deposit only" PIN number needed to access the child's account. In such a manner, the invited guest could simply take the invitation to a banking terminal 10, scan the bar code, and thereafter deposit money into the child's account by either inserting cash into the cash acceptors 24, 26 or transferring funds from the guest's credit, debit, or smart card via use of the card reader 18.

Moreover, the electronic banking terminal 10 is also preferably configured to accept gift cards on behalf of the child. For example, if a relative of the child purchases a gift card having stored thereon a cash amount, the card may be mailed or otherwise presented to the child. Thereafter, the child may take the gift card and "deposit" it into his or her account by inserting the gift card into the card reader 18 such that the amount stored on the card may then be transferred into the child's bank account.

It should be appreciated that in each of the situations described above, the user is required to enter two particular codes in order to gain access to the bank account: (1) the bank account number, and (2) the PIN number. Typically, the bank account number is stored on the user's card and is therefore entered by the card reader 18 when the user inserts his or her card. Thereafter, the user enters his or her PIN number by use of the touch screen monitor 20. However, as alluded to above, the bank account number may also be entered manually (i.e. through use of the touch screen monitor 20) or may be stored on a gift card or bar code. Similarly, although generally input manually, the PIN number may also be stored on the gift card or bar code, but is typically only done so in the case of a "deposit only" PIN number for security reasons.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

There are a plurality of advantages of the present invention arising from the various features of the electronic banking terminal described herein. It will be noted that alternative embodiments of the electronic banking terminal of the present invention may not include all of the features described yet still benefit from at least some of the advantages of such features. Those of ordinary skill in the art may readily devise their own implementations of an electronic banking terminal that incorporate one or more of the features of the present invention and fall within the spirit and scope of the present invention as defined by the appended claims.

Figure 2:
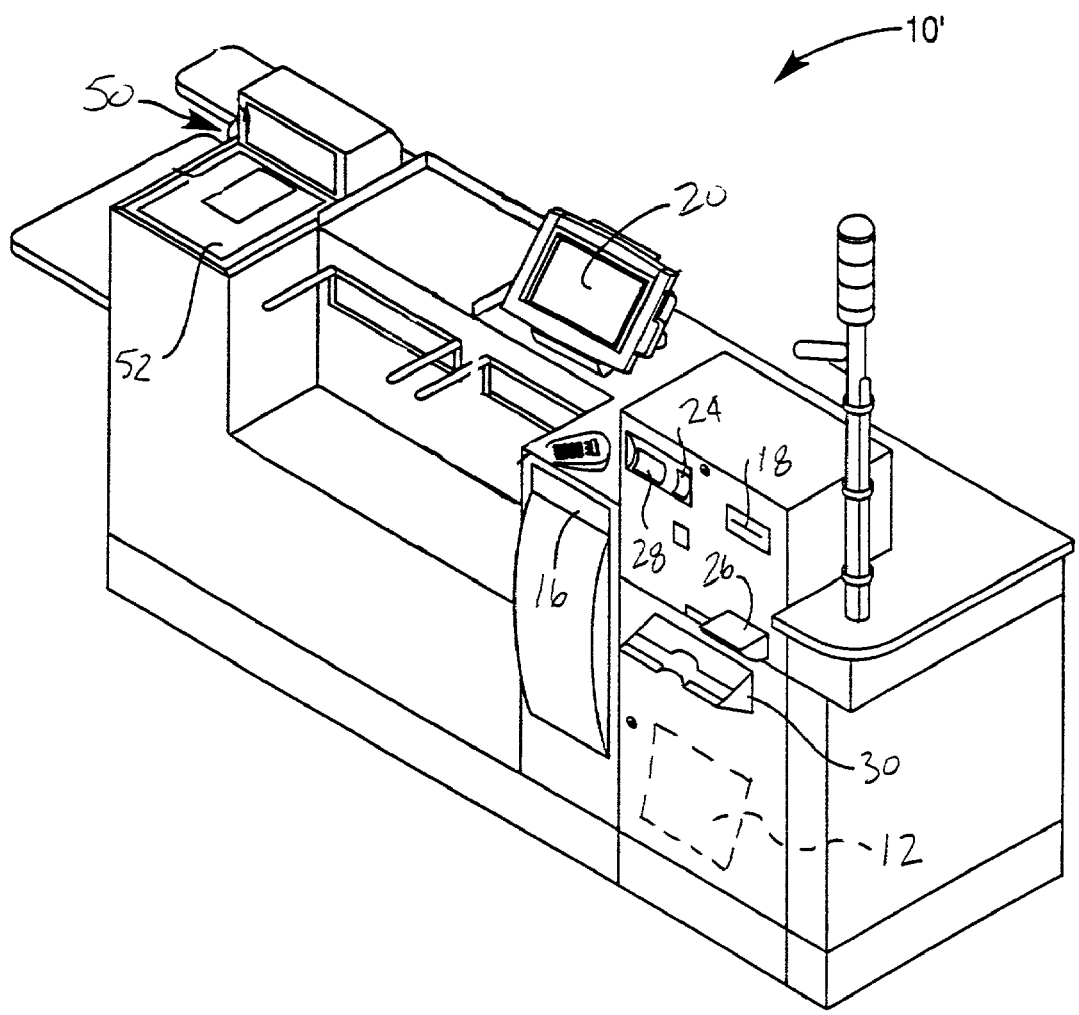
FIG. 2 is a perspective view of a point-of-sale retail terminal which incorporates the features of the electronic banking terminal of FIG. 1.

For example, as shown in FIG. 2, the components and functionality of the electronic banking terminal 10 may be integrated into a point-of-sale (POS) terminal 10' such as those utilized in grocery stores, department stores, and supermarkets. Such integration into the POS terminal 10' allows customers at the store to maintain their children's bank account in the manner previously discussed. As shown in FIG. 2, the POS terminal 10' includes a scanner 50 and a produce scale 52. In a known manner, the scanner 50 may be utilized to read bar codes or other indicia on an item for purchase thereby entering the item into the POS terminal 10' during performance of the transaction. Similarly, the produce scale 52 may also be utilized to weigh a produce item which is then entered into the POS terminal 10' by entry of a PLU code associated with the produce item.

When configured in the manner shown in FIG. 2, the currency acceptor/dispenser 14 performs two distinct functions. Firstly, the devices associated with the currency acceptor/dispenser 14 (i.e. the currency acceptors 24, 26 and the currency dispensers 28, 30) may be utilized to deposit and withdraw cash from a banking account in the manner previously discussed in regard to the electronic banking terminal 10. However, the devices associated with the currency acceptor/dispenser 14 may also be utilized during finalization of a checkout transaction. In particular, the currency acceptors 24, 26 may be utilized by a customer to tender payment for his or her items for purchase. Likewise, the currency dispensers 28, 30 may be utilized to dispense change or "cash back" to a customer at the completion of his or her checkout transaction.

Such a configuration provides a number of advantages. First of all, the retailer may utilize common components to perform multiple functions thereby eliminating the need to have separate terminals. Secondly, the customer (e.g. a parent or accompanying child) may simultaneously perform both a banking transaction and a checkout transaction.

The use of the multi-tiered PIN number concept also has additional applicability. For example, the customer's PIN number may be utilized to indicated that the customer is a minor. In such a case, if the customer attempted to purchase an item, the sale of which is restricted by statue or the like (e.g. alcohol or tobacco products), entry of the customer's PIN number could be utilized to "flag" the retailer that the customer is prohibited from purchasing such a restricted item.

What is claimed is:

1. A method of operating an electronic banking terminal, comprising the steps of:
    (a) permitting deposit of funds into a banking account in response to entry of a first personal identification number (PIN number) PIN number into said terminal;
    (b) operating said terminal to permit deposit of funds into said banking account in response to entry of a second PIN number into said terminal, said first PIN number being different than said second PIN number;
    (c) operating said terminal to permit user withdrawal of funds up to a first dollar amount limit from said banking account in response to entry of said first PIN number into said terminal; and
    (d) operating said terminal to permit user withdrawal of funds up to a second dollar amount limit from said banking account in response to entry of said second PIN number into said terminal, wherein said first dollar amount limit is less than said second dollar amount limit.

2. The method of claim 1, wherein said step (a) includes the steps of:
    (e) reading a code stored on a gift card to determine a gift dollar amount associated with said gift card, and
    (f) depositing said gift dollar amount into said banking account in response to said reading step.

3. The method of claim 1, further comprising the steps of:
    (e) permitting deposit of funds into said banking account in response to entry of a third PIN number into said terminal, said third PIN number being different than both said first PIN number and said second PIN number; and
    (f) prohibiting withdrawal of funds from said banking account in response to entry of said third PIN number into said terminal.

4. The method of claim 1, wherein:
    said banking account has an account number associated therewith,
    said step (c) includes the step of operating said terminal to permit user withdrawal of funds up to said first dollar amount limit from said banking account in response to entry into said terminal of (i) said account number, and (ii) said first PIN number, and
    said step (d) includes the step of operating said terminal to permit user withdrawal of funds up to said second dollar amount limit from said banking account in response to entry into said terminal of (i) said account number, and (ii) said second PIN number.

5. The method of claim 1, wherein:
    said electronic banking terminal includes a point-of-sale retail terminal having a currency acceptor, and
    said step (a) includes the step of operating said currency acceptor to accept a cash deposit into said terminal for said banking account.

6. The method of claim 5, further comprising the step of:
    (e) permitting cash to be accepted by said currency acceptor for payment of an item for purchase.

7. The method of claim 6, wherein: said point-of-sale retail terminal further has a currency dispenser,
    said step (c) includes the step of permitting said currency dispenser to dispense currency up to said first dollar amount limit, and
    said step (d) includes the step of permitting said currency dispenser to dispense currency up to said second dollar amount limit.

8. The method of claim 7, further comprising the step of:
(f) permitting said currency dispenser to provide change in response to cash being accepted by said currency acceptor for payment of said item for purchase.

9. The method of claim 6, wherein:
said point-of-sale retail terminal further has a touch screen monitor associated therewith,
said touch screen monitor is configured to permit entry into said terminal of either said first PIN number or said second PIN number.

10. The method of claim 9, further comprising the step of:
(g) permitting said touch screen monitor to enter an item code associated with said item for purchase into said terminal.

11. An electronic terminal, comprising:
an input device for receiving input from a user;
a processing unit electrically coupled to said input device; and
a memory device electrically coupled to said processing unit, wherein said memory device has stored therein a plurality of instructions which, when executed by said processing unit, causes said processing unit to:
(a) operate said terminal to permit deposit of funds into a banking account in response to entry of a first personal identification number (PIN number) into said terminal;
(b) operate said terminal to permit deposit of funds into said banking account in response to entry of a second PIN number into said terminal, said first PIN number being different than said second PIN number;
(c) operate said terminal to permit user withdrawal of funds up to a first dollar amount limit from said banking account in response to entry of said first PIN number into said terminal; and
(d) operate said terminal to permit user withdrawal of funds up to a second dollar amount limit from said banking account in response to entry of said second PIN number into said terminal, wherein said first dollar amount limit is less than said second dollar amount limit.

12. The electronic terminal of claim 11, further comprising a code reader configured to read a code stored on a gift card, wherein said plurality of instructions, when executed by said processing unit, further causes said processing unit to:
(e) read said code stored on said gift card to determine a gift dollar amount associated with said gift card, and
(f) deposit said gift dollar amount into said banking account in response to said reading step.

13. The electronic terminal of claim 11, wherein said plurality of instructions, when executed by said processing unit, further causes said processing unit to:
(e) operate said terminal to permit deposit of funds into said banking account in response to entry of a third PIN number into said terminal, said third PIN number being different than both said first PIN number and said second PIN number; and
(f) operate said terminal to prohibit withdrawal of funds from said banking account in response to entry of said third PIN number into said terminal.

14. The electronic terminal of claim 11, wherein:
said banking account has an account number associated therewith, and
said plurality of instructions, when executed by said processing unit, further causes said processing unit to:
operate said terminal to permit user withdrawal of funds up to said first dollar amount limit from said banking account in response to entry into said terminal of (i) said account number, and (ii) said first PIN number, and
operate said terminal to permit user withdrawal of funds up to said second dollar amount limit from said banking account in response to entry into said terminal of (i) said account number, and (ii) said second PIN number.

15. The electronic terminal of claim 11, further comprising (i) a scanner operable to permit entry of an item for purchase into said terminal, and (ii) a currency acceptor operable to receive currency into said terminal, wherein said plurality of instructions, when executed by said processing unit, further causes said processing unit to:
operate said currency acceptor to accept a cash deposit into said terminal for said banking account, and
operate said currency acceptor so as to permit cash to be accepted by said currency acceptor for payment of an item for purchase.

16. The electronic terminal of claim 15, further comprising a currency dispenser for dispensing currency, wherein said plurality of instructions, when executed by said processing unit, further causes said processing unit to:
operate said currency dispenser to dispense currency up to said first dollar amount limit, and
further operate said currency dispenser to dispense currency up to said second dollar amount limit.

17. The method of claim 16, wherein said plurality of instructions, when executed by said processing unit, further causes said processing unit to:
operate said currency dispenser to provide change in response to cash being accepted by said currency acceptor for payment of said item for purchase.

18. The electronic terminal of claim 11, wherein:
said input device includes a touch screen monitor, and
said touch screen monitor is configured to permit entry into said terminal of either said first PIN number or said second PIN number.

19. The electronic terminal of claim 18, wherein said plurality of instructions, when executed by said processing unit, further causes said processing unit to:
(g) operate said touch screen monitor to enter an item code associated with said item for purchase into said terminal.

20. An automated teller machine system comprising:
a processing unit operatively coupled to said input device; and
a memory device operatively coupled to said processing unit, wherein said memory device has stored therein a plurality of instructions which, when executed by said processing unit, causes said processing unit to:
(a) compare a first received personal identification number (PIN number) with a plurality of PIN numbers associated with an account;
(b) determine that the first received PIN number corresponds to a first of the plurality if PIN numbers;
(c) permit reduction of funds from the account based upon the correspondence of the first received PIN number with the first of the plurality of PIN numbers;

(d) compare a second received PIN number with the plurality of PIN numbers associated with the account;

(e) determine that the second received PIN number corresponds to a second of the plurality of PIN numbers;

(f) permit posting of funds to the account based upon the correspondence of the second received PIN number with the second of the plurality of PIN numbers; and (g) not permit removal of funds from the account based upon the correspondence of the second received PIN number with the second of the plurality of PIN numbers.

* * * * *